(12) United States Patent
McMurtrie (10) Patent No.: US 8,613,031 B2
(45) Date of Patent: Dec. 17, 2013

(54) METHOD FOR TRANSFERRING VIDEO AND SOUND DATA DIRECTLY BETWEEN DISTINCT DIGITAL VIDEO RECORDERS

(76) Inventor: David B. McMurtrie, Rochester Hills, MI (US)

( * ) Notice: Subject to any disclaimer, the term of this patent is extended or adjusted under 35 U.S.C. 154(b) by 329 days.

(21) Appl. No.: 12/758,792

(22) Filed: Apr. 12, 2010

(65) Prior Publication Data

US 2010/0263011 A1 Oct. 14, 2010

Related U.S. Application Data

(60) Provisional application No. 61/212,606, filed on Apr. 13, 2009.

(51) Int. Cl.
*H04N 7/173* (2011.01)

(52) U.S. Cl.
USPC ............................................ 725/110; 709/219

(58) Field of Classification Search
USPC .............................. 725/86–118; 209/217–231
See application file for complete search history.

(56) References Cited

U.S. PATENT DOCUMENTS

| | | | |
|---|---|---|---|
| 7,365,655 B2 * | 4/2008 | Rao et al. ........................ | 341/50 |
| 7,457,520 B2 | 11/2008 | Rossetti et al. | |
| 7,486,869 B2 | 2/2009 | Alexander et al. | |
| 7,546,283 B2 * | 6/2009 | Ota ..................................... | 1/1 |
| 7,895,633 B2 * | 2/2011 | Van Hoff et al. .............. | 725/109 |
| 8,074,251 B2 * | 12/2011 | Aoki et al. .................... | 725/131 |
| 2006/0136966 A1 | 6/2006 | Folk, II | |
| 2007/0127887 A1 | 6/2007 | Yap et al. | |

OTHER PUBLICATIONS

"TiVo and One True Media Offer Consumers Easy New Way to Share Home Movies With Friends and Family Across the Country, Right to Their TiVo Boxes" http://www.prnewswire.com/news-releases/tivo-and-one-true-media-offer-consumers-easy-new-way-to-share-home-movies-with-friends-and-family-across-the-country-right-to-their-tivo-boxes-52183772.html.

* cited by examiner

*Primary Examiner* — Annan Shang
(74) *Attorney, Agent, or Firm* — Mastrogiacomo PLLC (57) ABSTRACT

A method for transferring video and sound data from a first digital video recorder situated in a first local area network to a second digital video recorder situated in a second local area network comprising the steps of recording video and sound data with the first digital video recorder in the first local area network, providing a distinct address of the second digital video recorder in the second local area network, identifying the second digital video recorder in the second local area network by the address, establishing a direct and secure connection between the first digital video recorder in the first local area network and the second digital video recorder in the second local area network and sending the video and sound data from the first digital video recorder through a communications network to the second digital video recorder.

20 Claims, 6 Drawing Sheets

METHOD FOR TRANSFERRING VIDEO AND SOUND DATA DIRECTLY BETWEEN DISTINCT DIGITAL VIDEO RECORDERS

CROSS REFERENCE TO RELATED APPLICATIONS

This patent application claims the benefit of priority based on U.S. Provisional Patent Application No. 61/212,606 filed on Apr. 13, 2009, which is incorporated by reference in its entirety for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON COMPACT DISC

Not Applicable

BACKGROUND OF THE INVENTION

1. Field of the Invention

The present invention relates generally to recording devices used in a communications system, and, more specifically to a method for transferring video and sound data directly between a digital video recorder in a first distinct network to another digital video recorder in a second distinct network through a multichannel broadband communications network such as a cable, satellite or wireless network.

2. Background Art

Personalized recording of television shows, movies, sporting events and the like has been an ever increasing trend over the last several decades. The personalized recording of these programs has migrated from the video cassette recorder (VCR) to the digital video disc (DVD) recorder to the digital video recorder (DVR) also known as a personal video recorder (PVR). While each of the DVR, DVD and VCR will provide for recording a program at one point in time for viewing at a later point in time, recordings made by DVR have distinct advantages to those recordings made by DVD and VCR.

First, DVRs typically contain a computer hard drive, e.g., a disk, which allows an individual to store recorded material directly to the DVR rather than a separate medium such as a magnetic tape as is used with a VCR or compact optical disc as is used with DVDs. Second, DVRs allow an individual to pause live programming, rewind and replay a portion previously telecast. Once a particular portion of the program has been replayed and reviewed to the viewer's satisfaction, an individual may begin watching the program again at the point it was paused without missing any of the remaining program.

A third advantage that DVRs provide is the ability to program the DVR to record at a specified time from remote locations. While individuals may program a VCR or DVD to record a particular program, generally, the VCR and DVD are programmed on location and set to a specific time to record that usually cannot be changed once the individual leaves the premises. Typically, an individual may program each of these recording means to record a specified program at a specified time. However, with DVRs, individuals who may have forgotten to program their DVR previously to record a program may direct their DVR to record a show with the use of their cellular telephone or computer from a remote location through the internet.

Although the DVR has revolutionalized personal recording of television programs and movies, there is, however, one advantage that the DVD and VCR still maintain over a DVR. Recordings made by DVD and VCR may be preserved on mass storage devices such as a compact disc and magnetic tape, respectively. The disc and tape may be easily stored and moved. This allows for easy transport and viewing of the recording at almost any locale as long as there is a VCR or DVD player on location. As stated above, DVRs store recordings on a mass storage device or hard drive that is internal to the DVR, there may be no external media such as a tape or compact disc to capture the program. Although possible, it is very cumbersome to move a DVR for viewing of the program elsewhere. A VCR tape and DVD compact disc may also provide for practically unlimited storage space as long as there is room to physically store the tape or disc. Conversely, the hard disk of the DVR typically has a finite storage space that may not be used to store a large number of previously recorded programs if new programs are to be recorded.

A further drawback of today's DVR occurs if an individual has forgotten to record a program or, after talking with another, has found a previously aired program to be interesting and worth viewing. In this instance, if the program has not been recorded by the individual to their own DVR, the individual may have missed their opportunity to view the program altogether, e.g. a sporting event. In the past, if one had recorded the program to a VCR tape or DVD compact disc, the tape or disc could easily be provided to a second individual for their own personal viewing. A recording made by DVR is not as easy to provide to a second individual for personal viewing. The internal DVR hard drive and overall size of the DVR make it difficult and cumbersome to move to a second location for viewing by another and nearly impossible to do if the second individual does not live in the same locale as the first. While the internet and electronic mail may be used to transfer previously recorded programming to another individual, the recordings are often very large and difficult to transfer and also require internet access to do so.

Therefore, a need exists for a method to transfer video and sound data directly between a digital video recorder in a first distinct network to another digital video recorder in a second distinct network through a multichannel broadband communications network such as a cable, satellite or wireless network.

BRIEF SUMMARY OF THE INVENTION

In accordance with the present invention a method for transferring video and sound data from a first digital video recorder situated in a first local area network to a second digital video recorder situated in a second local area network comprising the steps of recording video and sound data with the first digital video recorder in the first local area network, providing a distinct address of the second digital video recorder in the second local area network, identifying the second digital video recorder in the second local area network by the address, establishing a direct and secure connection between the first digital video recorder in the first local area network and the second digital video recorder in the second local area network, the first local area network being separate and distinct from the second local area network, sending the video and sound data from the first digital video recorder in the first local area network through a communications network to the second digital video recorder in the second local area network, enabling the second digital video recorder in the second local area network to access the video and sound data from the first digital video recorder in the first local network through the use of a distinct passcode, receiving the video and sound data with the second digital video recorder in the second local area network, wherein the first local area network is serviced through a first service area node by a first network, service provider and the second local area network is serviced through a second service area node by a second network service provider, wherein the first digital video recorder situated in the first local area network is operated by a first user under a first user account and the second digital video recorder in the second local area network is operated by a second user under a second user account and wherein the first network service provider and the second network service provider communicate throughout the communications network.

BRIEF DESCRIPTION OF THE SEVERAL VIEWS OF THE DRAWINGS

The features and inventive aspects of the present invention will become more apparent from the following detailed description, claims, and drawings, of which the following is a brief description:

DETAILED DESCRIPTION OF THE INVENTION

Referring now to the drawings, a preferred illustrative embodiment of the present invention is shown in detail. Although the drawings represent an embodiment of the present invention, the drawings are not necessarily to scale and certain features may be exaggerated to better illustrate and explain the present invention. Further, the embodiment set forth herein is not intended to be exhaustive or otherwise to limit or restrict the invention to the precise forms and configurations shown in the drawings and disclosed in the following detailed description.

The present invention provides a method for transferring video content directly between a digital video recorder (DVR) in a first distinct network to another digital video recorder in a second distinct network through a communications network such a multichannel communications network, a cable television network, a satellite network, a hybrid fiber coaxial network or wireless network. While the present invention is directed to a DVR that is a standalone component, it is important to note the present invention may be applied to any type of personal recording device (PVR) that may operate in a communications network including, but not limited to a DVR/Television composite structure and the like. As described below, the present invention overcomes the aforementioned limitations of conventional DVR capabilities by providing a means to transfer video content directly between DVRs in distinct networks.

Figure 1:
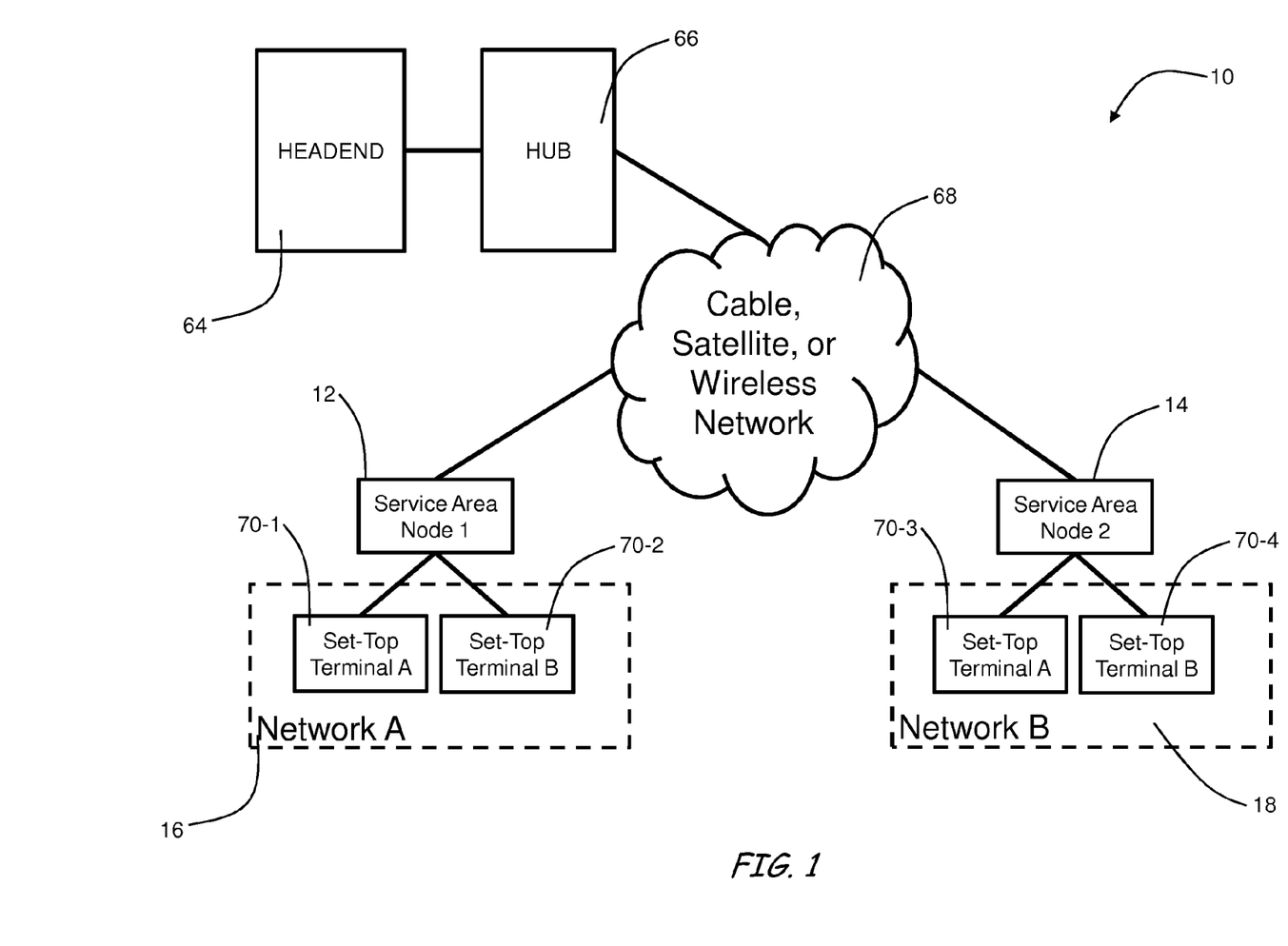
FIG. 1 is a block diagram of a multichannel broadband communications system in accordance with the present invention.

A typical communications network or system 10 is illustrated in FIG. 1 for providing information and television programming content to a user through set-top terminals. In this instance, system 10 includes a cable, satellite or wireless network for delivering the information and programming to set-top terminals on the user premises. Although system 10 is illustrated with a cable, satellite or wireless network, it is important to note, however, that system 10 may employ any type of communications network for distributing programming and information to a wide audience. In this particular embodiment of the present invention, a cable network will be used to fully describe the operations of network 10. As shown in FIG. 1, system 10 includes a headend 64, hub 66 and a hybrid fiber coax (HFC) cable network 68.

Headend 64 receives programs and services from various providers and sources, e.g. analog and digital sources, application servers, the Internet, etc. Analog and digital services typically provide the traditional forms of television broadcast programs and information services. Application servers typically provide executable code and data application specific services. Headend 64 processes programming materials including, e.g., TV program streams, from one or more of the aforementioned sources in analog and digital forms. It will be appreciated by one skilled in the art that the services discussed above are exemplary only and that any transmission system for delivering information content such as video to a consumer may be employed.

As further illustrated by FIG. 1, network 68 may be connected to any number of service nodes 1 through n. Typically, a service area node can be described as a regional, district or neighborhood distribution point for the cable, satellite or wireless network. In this particular description of the preferred embodiment network 68 is shown connected to a Service Area Node 1 12 and a Service Area Node 2 14. From the service area node, the information and programming provided through network 68 can be distributed further to a Network A 16 from Node 1 12 and a Network B 18 from Node 2 14, more commonly known as a house, building or any other multitude of networks that will ultimately use the data signal provided through network 68. Within Network A 16 and Network B 18 are Set-Top Terminal A 70-1, 70-3 and Set-Top Terminal B 70-2, 70-4, typically known as the decoder terminal that interfaces with a television to provide the communications data from cable network 68 to an individual. In this particular embodiment of the present invention, set-top terminal 70 may be a PVR, more commonly known as a DVR.

DVRs are typically used by individuals to record any type of television programming (television shows, live sporting events, movies, etc.) provided on any number of communications networks such as cable, satellite or wireless networks. DVRs allow one to record a program and store the program on an internal hard drive housed in the DVR for viewing at a later time, to replay action from a live event and the like. Generally, DVRs may be used in conjunction with a communications network such as a cable, satellite or wireless network to record shows provided by the system 10 through the network 68. Each DVR may be encoded with its own specific and unique address so that they may be easily discernable by the communications network to ensure that the program intended for recording is actually being received and recorded by the intended user.

Figure 2:
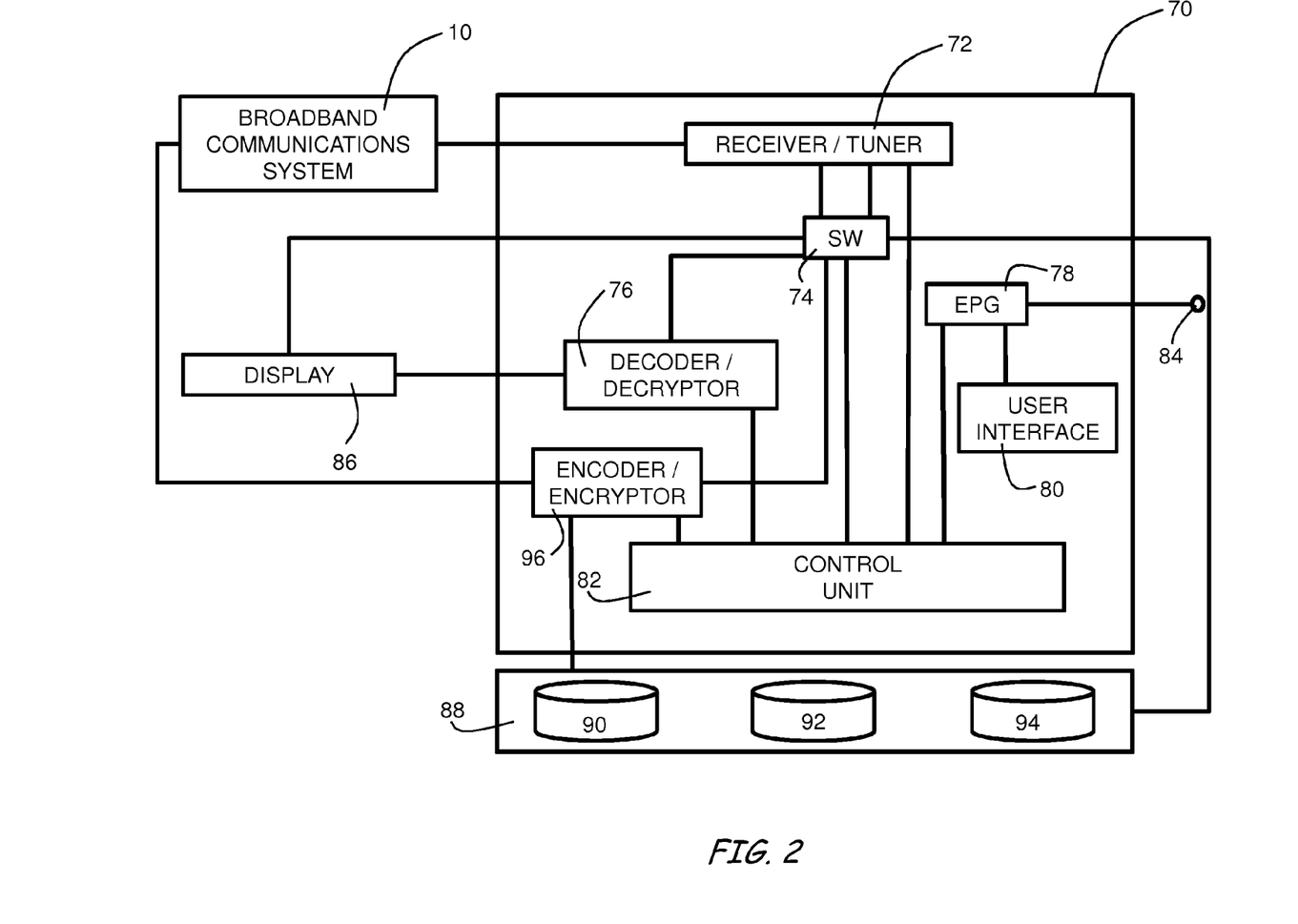
FIG. 2 is a block diagram of a typical digital video recording device according to an embodiment of the present invention.

FIG. 2 illustrates in greater detail set-top terminal 70 or a DVR according to an embodiment of the present invention.

Although a particular configuration for the DVR is described below, it is important to note that DVRs may be configured in any manner and the benefits of the disclosed embodiments of the present invention will still be realized. Set-top terminal 70 may be placed near or within a television or other display device such as a computer monitor. A display unit 86 is pictured in FIG. 2 and is connected to set-top terminal 70. Set-top terminal 70 receives content from multichannel broadband communications system 10 as was shown in FIG. 1. The received content is fed to a receiver/tuner 72 of set-top terminal 70. Receiver/turner 72 provides an appropriate connection for the DVR to the corresponding communications path. Receiver/tuner 72 may also select or tune a channel within the spectrum of content being fed to set-top terminal 70.

A switch 74 is connected to receiver/tuner 72 and routes the content to display unit 86, a decoder/decrypter 76 or a storage device 88. Switch 74 is controlled by a control unit 82 to route the content to the desired destination. Decoder/decrypter 76 includes decoder circuitry and/or decryption circuitry. Many video broadcasts are encoded and decoder 76 decodes this encoded content stream so that it may be viewed by the consumer on display unit 86. Decoder/decrypter 76 may also include decryption circuitry that decrypts encrypted content from the content feed. For example, some broadcasts, such as pay-per-view programming or pay movie stations, are sent through system 10 in an encrypted manner so that non-subscribers cannot view the content.

An electronic program guide (EPG) 78 is connected to control unit 82 and an input port 84 so that updates may be downloaded to the DVR. Guide 78 preferably displays information on display unit 86 to the user in the form of program selection menus. A sample of information that may be displayed by guide 78 is described below and is illustrated by FIGS. 4-9. Guide 78 may be downloaded by connecting port 84 to a telephone line, cable connection, satellite link-up, wireless connection, and the like.

A user interface 80 may include various control devices such as a keypad connected directly to set-top terminal 70 or a remote control device. User interface 80 provides the user a means to interact with the DVR and guide 78 and thereby select content for recording and on-demand playback.

Storage device 88 is connected to switch 74 as well as control unit 82 and decoder/decrypter 76. Storage device 88 may also be directly connected to display unit 86. Storage device 88 may include one or more hard disk drives 90, 92 and 94. Alternatively, storage device 88 may include other types of storage devices, such as solid state memory devices (chips, cards, sticks, etc.), magnetic tapes, optical discs and the like. Storage device 88 is used to store any of the programming that has been recorded by the DVR for later viewing.

Control unit 82 is connected to storage devices 88, decoder/decrypter 76, switch 74, receiver/tuner 72, guide 78 as well as user interface 80. In general, control unit 82 coordinates all the operations performed by the DVR and described above by sending appropriate controls signals to the various components.

Figure 3:
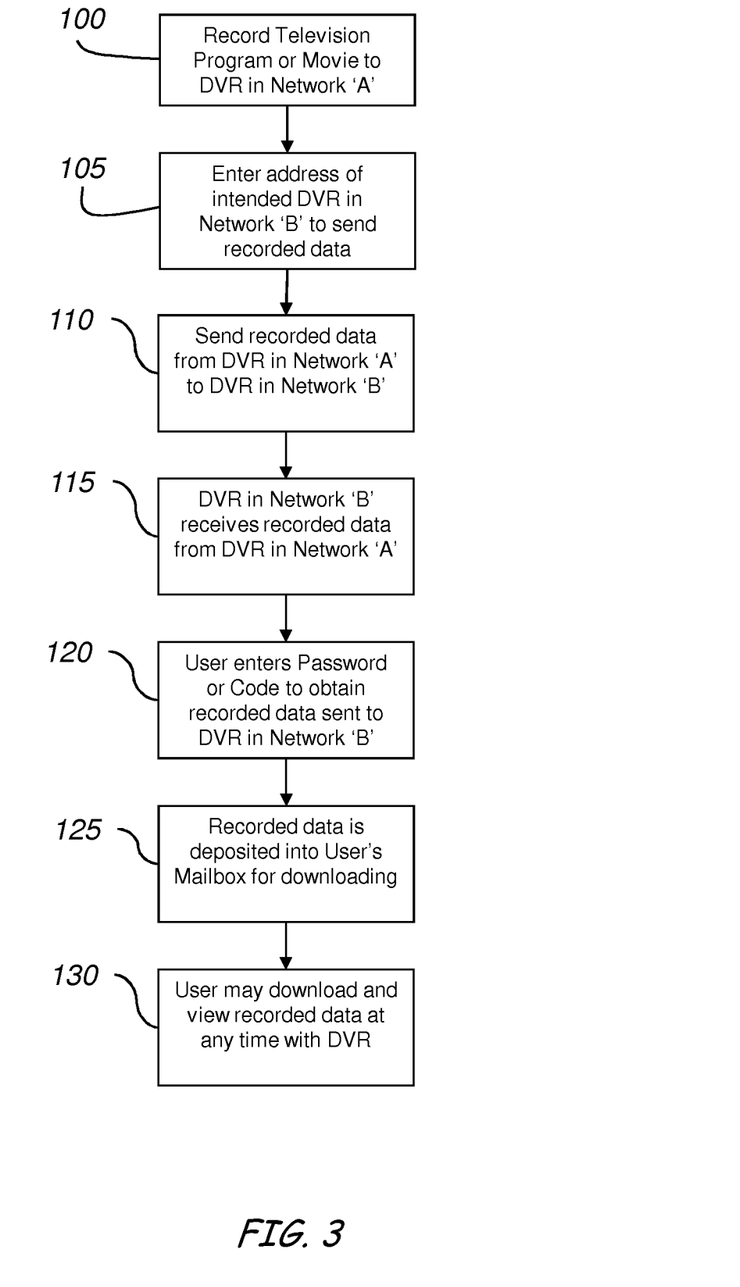
FIG. 3 is a flow diagram according to an embodiment of the present invention.

FIG. 3 illustrates further details of how the DVR of FIG. 2 operates in accordance with the present invention. A method for transferring the data stored in a DVR within a first distinct network such as Network A 16 to separate DVR within a second distinct network such as Network B 18 is shown in FIG. 3. In this particular embodiment of the present invention, Network A 16 may be a first dwelling situated in a first locale and Network B 18 may be a second dwelling situated in a second locale. An individual of Network A 16 may record a television program, movie, sporting event, etc. to storage device 88 of the DVR at step 100. The recording and saving of a program to the DVR or PVR may be completed in any number of known ways as provided by the DVR itself. Once recorded to the DVR, the programming is stored within storage device 88 of the DVR and will remain in storage device 88 until removed or erased.

Next, the individual located in Network B 18 may wish to obtain the recorded data from the individual in Network A 16. Once safely stored in storage device 88 of the DVR in Network A 16, the individual of Network A 16 may transfer the video and sound data from storage device 88 of the DVR in Network A 16 to a storage device of the DVR in Network B 18 in the following manner. As stated previously, each DVR will have its own unique address for identification purposes. The individual in Network A 16 may have the address of the DVR in Network B 18 to ensure that the video data is sent to the intended individual. The user address may be obtained in any number of ways. The individual of Network B 18 may provide the address directly or, alternatively, the individual of Network A 16 may obtain the address by performing a search for the address directly through the DVR. After obtaining the address, the individual of Network A 16 may program the DVR with the address of the DVR in Network B 18 as described in step 105.

Now referring to FIG. 2 once again, an encoder/encrypter 96 may be added to set-top terminal 70 and may be connected to control unit 82, switch 74, storage device 88 and system 10. Encoder/encrypter 96 is used to encrypt and/or encode the video content to be sent from Network A 16 to Network B 18 to provide a level of security for both users and system 10. Under the directions of the user, control unit 82 will direct storage device 88 of Network A 16 to send a particular program to encoder/encrypter 96 and through system 10 to the DVR of Network B 18. Encoder/encrypter 96 may also be used to program the DVR of Network A 16 with the address information of the DVR in Network B 18. Once an address is encoded and the video and sound content is encrypted, the video and sound content is ready to be sent from Network A 16 to Network B 18.

At step 110, the video data from storage device 88 in DVR of Network A 16 may be transferred through network 68 of system 10 to the DVR of Network B 18. The video data may be transferred in much the same way that video data is received from network 68. For example, in a cable system, data is sent to specific home networks as packets of information or transport streams through a coaxial cable. Video and sound data may also be transferred from the home network (Network A 16) though the coaxial cable and general communications network and may be received by the second home network (Network B 18). The unique address of the DVR in Network B 18 will ensure that video data is sent directly to that particular DVR of Network B 18 and will provide a level of security for the transferred data.

Next, the DVR of Network B 18 receives the video data at step 115. A further measure of security may be added to the video data retrieval. The individual of Network B 18 wishing to receive the video data may be required to enter a password or code at Step 120 that may be provided by the individual of Network A 16. Decoder/decrypter 76 may be used to ensure that a proper retrieval password or code is entered through user interface 80. This may prevent others from pirating the transferred signal and may also act as a parental control lock to ensure that children are not able to access transferred videos.

The video data is transferred into a mailbox of Network B 18 at step 125 and may be accessed by the individual in Network B 18 upon retrieval from the mailbox (described further below). The video data may be downloaded and saved to the storage device of the DVR of Network B 18 and will be available for viewing at step 130. The data may also be available for transfer to any DVR at the same locale. For example, a single residence, office or the like may have more than one DVR in use. The data that has been downloaded could be viewed with any one of the DVRs simply by transferring the data from one DVR to another DVR within the same residence, office, or the like.

In another embodiment of the present invention, companies providing the communication means, whether cable, satellite, wireless, or the like may also require a retrieval code to be used by the receiving network. Once again, decoder/decrypter 76 may be used in conjunction with user interface 80 for entering a particular code to view programming. The retrieval code may be advantageous to the companies as a means to develop a revenue stream from the transfer of video data. The communications companies may ask that a nominal fee be paid by the receiving network to access transferred videos that have been deposited in a mailbox. This may aid in covering the cost of transferring what could be rather large data files over their communication networks.

Figure 4:
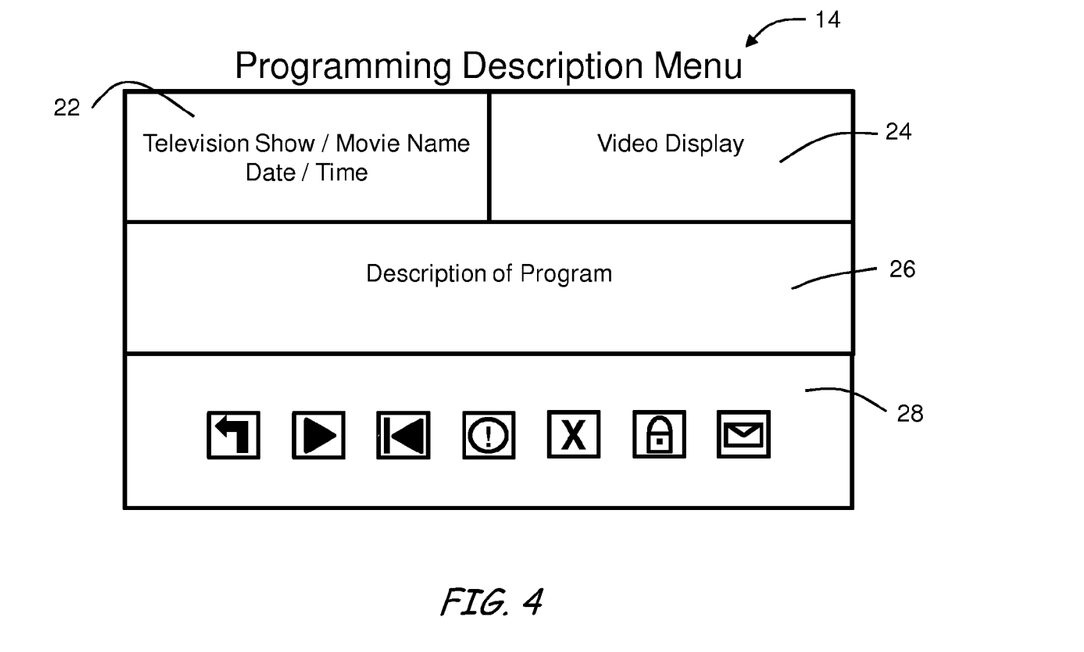
FIG. 4 illustrates a "Programming Description Menu" according to an embodiment of the present invention.
Figure 5:
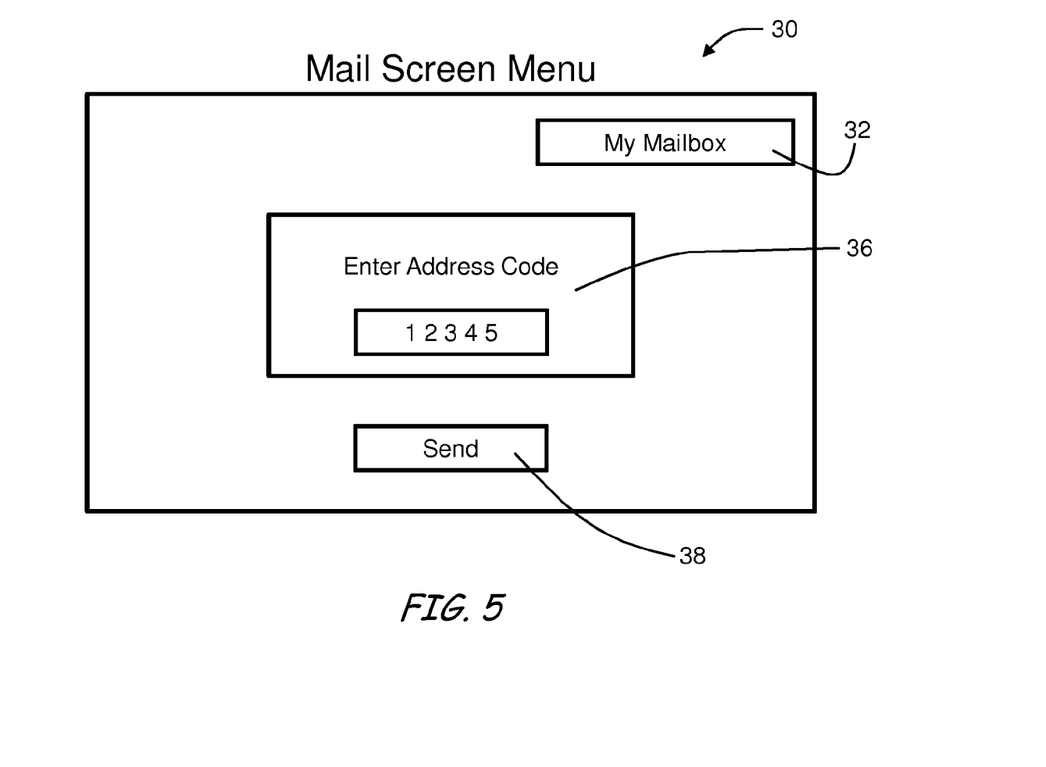
FIG. 5 illustrates a "Mail Screen Menu" according to an embodiment of the present invention.
Figure 6:
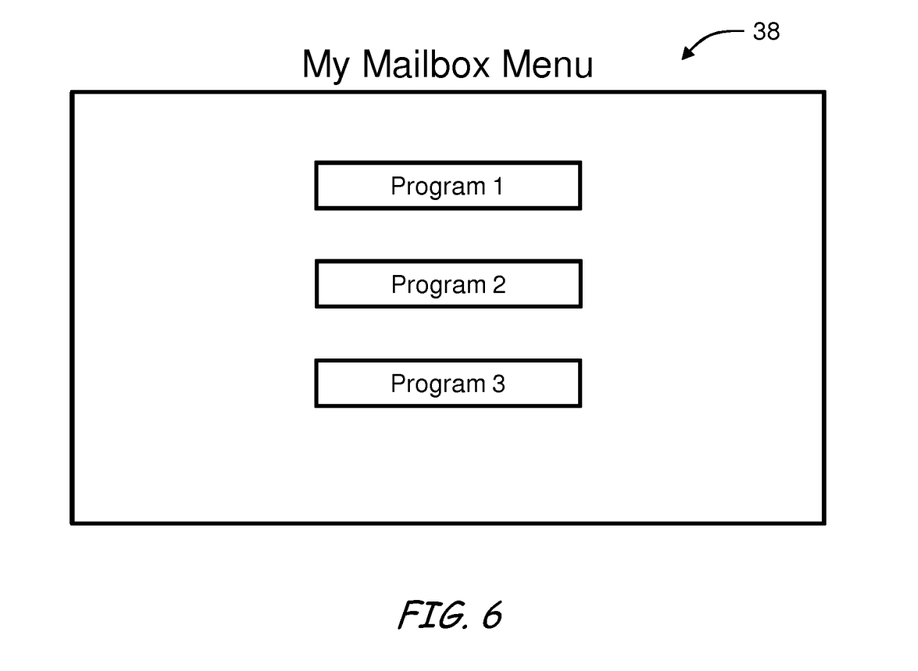
FIG. 6 illustrates a "My Mailbox Menu" according to an embodiment of the present invention.

FIGS. 4-6 illustrate a variety of menus or navigation screens typically displayed by guide 78 on display unit 86 that may be used to transfer and receive video data directly from a first DVR of Network A 16 to a second DVR of Network B 18. Any of the screens or menus may be navigated through user interface 80. A "Programming Description Menu" 20 is illustrated in FIG. 4. This particular menu may be the main menu for a typical DVR and may include a number of tiles for displaying information. An information tile 22 informs the user as to the name of the particular program and the date/time the program is available for viewing and recording. A video display tile 24 shows a clip of the particular programming being shown on a particular channel. A description tile 26 provides a description of the program. Menu 20 also provides a number of user interface buttons that allow an individual to navigate to other menus of the DVR and ultimately to a recorded program for viewing. These buttons are contained in an interface tile 28.

FIG. 5 illustrates a "Mail Screen Menu" 30 for the sending and receiving of video data. A typical "Mail Screen Menu" 30 may include a number of interfaces for sending and receiving electronic mail. A mailbox tile 32 provides access to a mailbox to retrieve messages and recorded video data sent by a separate DVR. A send tile 34 allows the individual to send the video data and messages. Lastly, an address code tile 36 provides a location to enter an address code for either sending or receiving video data to or from another individual.

FIG. 6 is a "My Mailbox Menu" 38 for retrieving the transferred video data. This particular menu is accessed from the "Mail Screen Menu" 30 of FIG. 4. The "My Mailbox Menu" may list all of the transferred video data that is available for retrieval and viewing.

Figure 7:
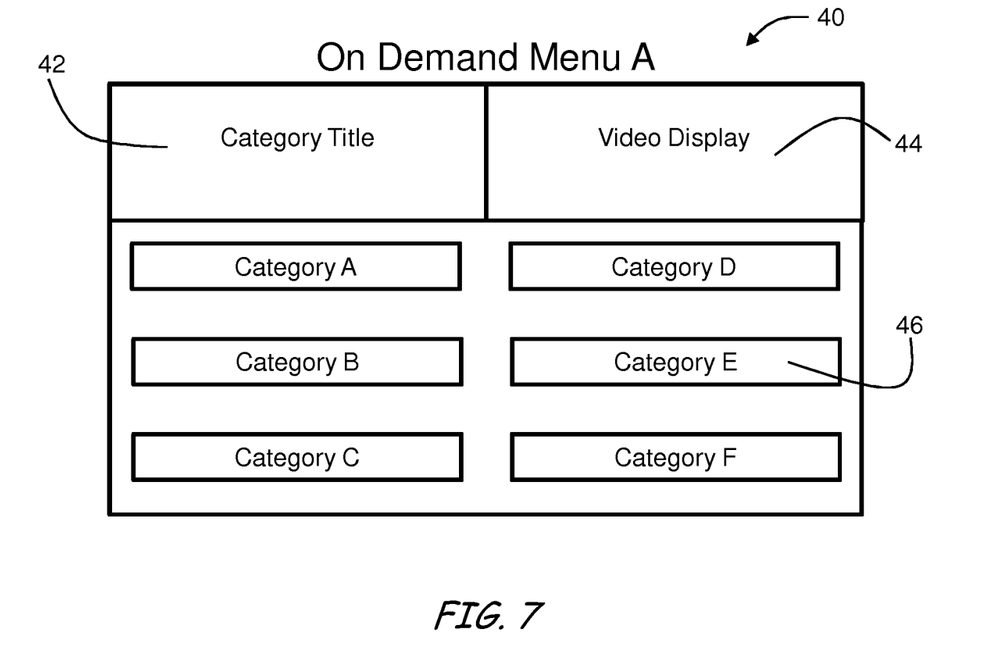
FIG. 7 illustrates an "On Demand Menu A" according to an embodiment of the present invention.
Figure 8:
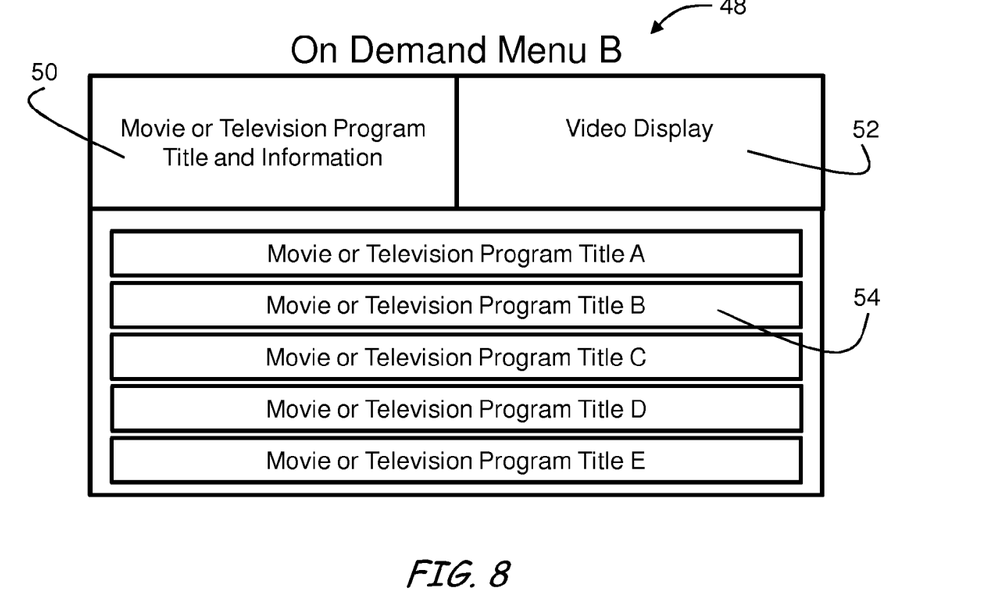
FIG. 8 illustrates an "On Demand Menu B" according to an embodiment of the present invention.
Figure 9:
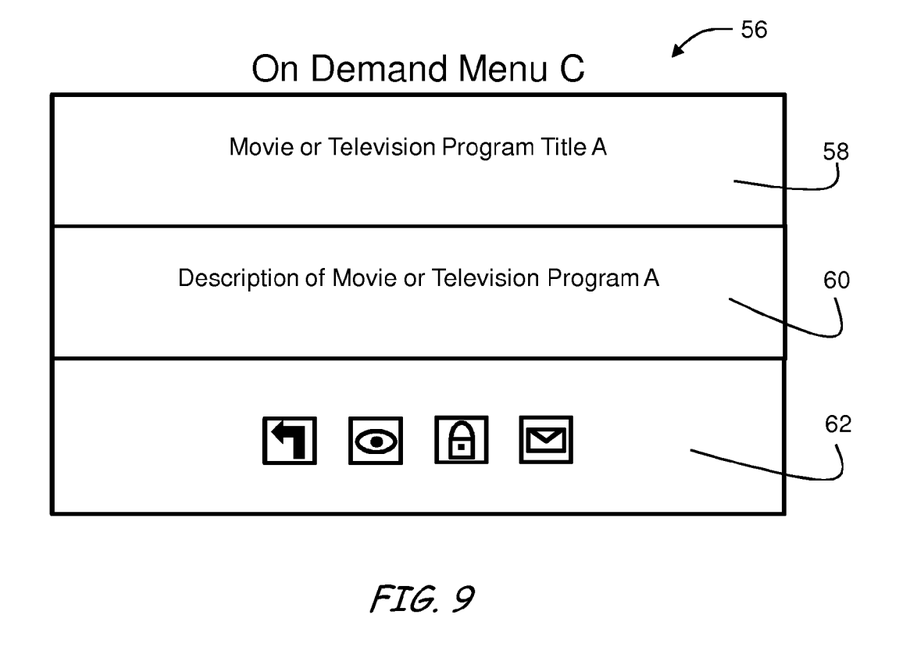
FIG. 9 illustrates an "On Demand Menu C" according to an embodiment of the present invention.

FIGS. 7-9 illustrate another embodiment of the present invention. In this particular embodiment, an individual may record "On Demand" type programming directly to storage device 88 of the DVR. Typically, "On Demand" viewing is a feature offered by a multichannel broadband communications company to allow individual the opportunity to view televisions programs, movies and the like at any time. Rather than waiting for a particular television program or movie to start, the individual may choose the time and date that suits them. Generally a fee is paid by the subscriber for the "On Demand" service that allows them to view the programming of their choice at the time and date of their choice.

FIG. 7 provides and illustration of a typical "On Demand Menu A" 40 that may be provided by a DVR and displayed on a television screen. This particular menu 40 allows an individual to select a particular programming category. A category tile 42 is used to display the category title or genre of particular television programming. A video display tile 44 shows a clip of a particular program pertaining to a particular category that has been selected. Selecting any of categories A through F from a selection tile 46 will direct the individual one layer down to a "On Demand Menu B" 48. It is important to note that although categories A-F are shown, "On Demand Menu A" 40 may include any number of categories.

"On Demand Menu B" 48 is shown in FIG. 8 and provides a menu for selecting the actual program to view. As with "On Demand Menu A" 40, "On Demand Menu B" 48 provides an information tile 50 that informs the user as to the name of the particular program. A video display tile 52 shows a clip of the particular programming being shown on a particular channel. A selection tile 54 allows an individual to select a particular movie or programming for viewing.

Once a particular program has been selected, "On Demand Menu C" 56 is displayed as illustrated in FIG. 9. This particular menu 56 provides title tile 58 that informs the user as to the title of the particular program and a description tile 60 provides a description of the program. An interface tile 62 allows the individual to return to the previous menu, view the selected program, apply a parental lock to the program and send the program to a second individual in a manner described above. Once again, as described above, the communications companies may require that a fee be paid by the receiving individual to view the transferred programming.

The embodiments of the present invention may provide individuals with an easy and efficient manner for sharing television programming, movies, sporting events, home movies and the like. Any video data may be transferred between a DVR in Network A 16 to a DVR in Network B 18 over the multichannel broadband communications system. The DVRs themselves may include the navigation menus and storage mediums that allow individuals to easily transfer data without having to use secondary means such as the internet. The present invention provides means for directly and efficiently transferring video data directly between DVRs situated in different locales or even those in the same network or house but connected to separate televisions in separate rooms.

The present invention has been particularly shown and described with reference to the foregoing embodiment, which is merely illustrative of the best modes presently known for carrying out the invention. It should be understood by those skilled in the art that various alternatives to the embodiment of the invention described herein may be employed in practicing the invention without departing from the spirit and scope of the invention as defined in the following claims. It is intended that the following claims define the scope of the invention and that the method within the scope of these claims and their equivalents by covered thereby. This description of the invention should be understood to include all novel and non-obvious combination of elements described herein, and claims may be presented in this or a later application to any novel non-obvious combination of these elements. Moreover, the foregoing embodiment is illustrative, and no single feature or element is essential to all possible combinations that may be claimed in this or a later application.

What is claimed is:

1. A method for transferring video and sound data from a first digital video recorder situated in a first local area network to a second digital video recorder situated in a second local area network comprising the steps of:

recording video and sound data with the first digital video recorder in the first local area network;

providing a distinct address of the second digital video recorder in the second local area network;

identifying the second digital video recorder in the second local area network by the address;

establishing a direct and secure connection between the first digital video recorder in the first local area network and the second digital video recorder in the second local area network, the first local area network being separate and distinct from the second local area network;

sending the video and sound data from the first digital video recorder in the first local area network through a communications network to the second digital video recorder in the second local area network;

enabling the second digital video recorder in the second local area network to access the video and sound data from the first digital video recorder in the first local network through the use of a distinct passcode;

receiving the video and sound data with the second digital video recorder in the second local area network;

wherein the first local area network is serviced through a first service area node by a first network service provider and the second local area network is serviced through a second service area node by a second network service provider;

wherein the first digital video recorder situated in the first local area network is operated by a first user under a first user account and the second digital video recorder in the second local area network is operated by a second user under a second user account; and wherein the first network service provider and the second network service provider communicate throughout the communications network.

2. The method of claim 1, wherein the video and sound data is recorded to a first storage device of the first digital video recorder.

3. The method of claim 1, further comprising the step of encoding the video and sound data prior to being sent by the first digital recorder.

4. The method of claim 1, wherein the first digital recorder is identified by a first distinct address and the second digital recorder is identified by the distinct address.

5. The method of claim 4, further comprising the step of obtaining the distinct address of the second digital recorder through a search of digital video recorders within the communications network.

6. The method of claim 5, further comprising the step of sending encoded video and sound data from the first digital video recorder having a distinct first address in the first local area network thorough a communications network to a second digital video recorder having a distinct address in a second local area network.

7. The method of claim 6, further comprising the step of decoding the video and sound data after being received by the second digital video recorder.

8. The method of claim 1, further comprising the steps of storing the video and sound data in a mailbox for access by the second digital video recorder in the second local area network;

downloading the video and sound data onto a second storage device of the second digital video recorder in the second local area network; and accessing the video and sound data on the second digital recorder through various navigation menus and program guides.

9. The method of claim 1, wherein the communications network is a multichannel broadband communications network.

10. The method of claim 1, wherein the communications network is cable television network.

11. The method of claim 1, wherein the communications network is a satellite network.

12. The method of claim 1, wherein the communications network is a hybrid fiber coaxial network.

13. A method for transferring video and sound data from a first digital recorder situated in a first local area network to a second digital video recorder situated in a second local area network comprising the steps of:

recording video and sound data with the first digital video recorder to a first storage device in the first local area network;

encoding the video and sound data prior to sending the data from the first digital video recorder;

providing a distinct address of the second digital video recorder in the second local area network;

identifying the second digital video recorder in the second local area network by the address;

establishing a direct and secure connection between the first digital video recorder in the first local area network and the second digital video recorder in a second local area network, the first local area network being separate and distinct from the second local area network;

sending the video and sound data from the first digital video recorder in the first local area network through a communications network to the second digital video recorder in the second local area network;

enabling the second digital video recorder in the second local area network to access the video and sound data from the first digital video recorder in the first local network through the use of a distinct passcode;

receiving the video and sound data with the second digital video recorder in the second local area network;

decoding the video and sound data;

storing the video and sound data in a mailbox for access by the second digital video recorder in the second local area network;

downloading the video and sound data on a second storage device of the second digital video recorder in the second local area network;

accessing the video and sound data on the second digital video recorder through various navigation menus and program guides;

wherein the first local area network is serviced through a first service area node by a first network service provider and the second local area network is serviced through a second service area node by a second network service provider;

wherein the first digital video recorder situated in the first local area network is operated by a first user under a first user account and the second digital video recorder in the second local area network is operated by a second user under a second user account; and wherein the first network service provider and the second network service provider communicate throughout the communications network.

14. The method of claim 13, wherein the first digital recorder is identified by a first distinct address and the second digital recorder is identified by the distinct address.

15. The method of claim 14, further comprising the step of obtaining the distinct address of the second digital recorder through a search of digital video recorders within the communications network.

16. The method of claim 15, further comprising the step of sending encoded video and sound data from the first digital video recorder having the distinct first address in the first local area network thorough a communications network to a second digital video recorder having the distinct address in a second local area network.

17. The method of claim 13, wherein the communications network is a multichannel broadband communications network.

18. The method of claim 13, wherein the communications network is cable television network.

19. The method of claim 13, wherein the communications network is a satellite network.

20. The method of claim 13, wherein the communications network is a hybrid fiber coaxial network.

* * * * *